United States Patent [19]
Kern et al.

[11] Patent Number: 6,148,471
[45] Date of Patent: Nov. 21, 2000

[54] PRECISION LENS BOND TESTER/ PARTICULATE REMOVAL APPARATUS FOR OPTICAL SUBASSEMBLIES

[76] Inventors: Daniel Kern, 118 Conestoga Dr., Sinking Spring, Berks, Pa. 19608; Eugene S. Messenger, 351 E. Walnut St., Apt. B, Kutztown, Berks, Pa. 19530

[21] Appl. No.: 09/395,620

[22] Filed: Sep. 14, 1999

[51] Int. Cl.[7] .............................. B08B 5/02; B08B 5/04
[52] U.S. Cl. ........................ 15/303; 15/309.2; 15/345; 134/37; 134/21; 134/32; 134/33; 134/34
[58] Field of Search .................... 15/300.1, 302, 15/303, 345, 346, 309.1, 320; 134/32, 33, 34, 37, 902, 21

[56] References Cited

U.S. PATENT DOCUMENTS 5,333,225  7/1994  Jacobowitz et al. ..................... 385/93
5,906,138  9/1998  Kawasaki ................................. 15/303
6,043,443  3/2000  Doran et al. ............................ 209/573
6,058,676  5/2000  Abraham et al. ........................ 53/287
6,059,893  5/2000  Kawasaki ................................. 134/37

Primary Examiner—Hoa Q. Pham

[57] ABSTRACT

A particulate removal and lens bond test device includes a base for receiving a waffle pack holding a plurality of optical subassemblies (OSAs) to be tested and an associated applicator for applying a predetermined flow of gas across the OSAs to remove loose particulates and to test the bond strength of the lens on the OSA. The applicator includes a flow regulator and a plurality of orifices arranged to direct the flow of gas onto each individual OSA in the waffle pack.

15 Claims, 5 Drawing Sheets

6,148,471

PRECISION LENS BOND TESTER/ PARTICULATE REMOVAL APPARATUS FOR OPTICAL SUBASSEMBLIES

BACKGROUND OF THE INVENTION

1. Field of the Invention

The present invention relates to a device for removing loose particulates and testing lens bond strength on optical subassemblies by applying a regulated flow of nitrogen to the optical subassembly.

2. Description of the Related Art

Fiber optical systems are increasingly being used to transmit digital information over long distances in the form of light pulses because they exhibit a very large capacity for carrying information, are light-weight, and are immune to electromagnetic interference. One of the most significant components of these systems are the optical subassemblies (OSAs) which generate the light pulses, i.e. the optical signals.

The OSA includes a semiconductor laser diode, a spherical ball lens, and a monitor photodiode mounted on a silicon optical bench (siob). The fabrication of the OSA is typically divided into two parts: the mechanical assembly steps and the testing steps. During the mechanical assembly steps, the laser diode, the photodiode and the spherical lens are attached to the siob via an epoxyless attachment. Generally, a coating on the spherical lens bonds with a coating on the siob through a heating procedure after the spherical lens is placed on the siob. Ribbon bonds are then added to connect the laser diode and the photodiode to the siob.

Early manufacturing techniques for prior art OSAs were typically performed in "clean rooms" to prevent particulates from settling on the OSAs during manufacture. However, "clean rooms" are expensive to operate and maintain. Since then, hooded enclosures have been used in regular office space; the hooded enclosures are much less expensive to operate and maintain. However, hooded enclosures are not as clean as "clean rooms" and some particulates do settle on the OSAs, thereby adding an additional required step of particulate removal to the assembly process. After the OSAs, have been assembled, they are loaded onto waffle packs in groups of 50 and are then typically subjected to a flow of air in an effort to remove any loose particles. The flow of air also serves to test the bond strength between the lens and the siob. The prior art procedure for applying this flow of air uses a hand-held blower, such as an Aero-Duster®; however, a particular disadvantage of this method for removing loose particulates and for testing lens bond strength is that personnel performing the operation inconsistently apply the flow of air to the OSAs. At one extreme, this inconsistent application may result in too much air flow being applied to the waffle pack, causing one or more of the OSAs to become dislodged from the waffle pack. At the other extreme, the application of too little air flow causes inadequate removal of loose particles and inadequate testing of the bond strength of the lens.

SUMMARY OF THE INVENTION

The apparatus of the invention is implemented in a preferred embodiment in a device having a base for receiving a waffle pack configured for holding 50 optical subassemblies (OSAs). The base also includes a vacuum system for retaining the OSAs in place in the waffle pack. To expose the OSAs to a flow of gas, the device includes a movable applicator movable between a raised and a lowered position. The applicator has 50 orifices are arranged so that each positionally corresponds to the side of the respective lens of one of the 50 OSAs in the waffle pack held in the base when the applicator is moved to the lowered position; this positioning maximizes the bond strength test capability of the applicator. The applicator is connected to a Nitrogen gas supply such that a flow of Nitrogen gas may be operatively applied to the OSAs through the orifices. After the testing procedure is complete, the applicator is moved to the raised position, thereby allowing the waffle pack to be removed. The OSAs are then inspected to ensure that all loose particles have been removed and that the spherical lenses are still in place, which evidences a proper bond strength.

The particulate removal and lens bond testing apparatus according to the invention allows OSAs with faulty lens bonds to be detected and removed before further testing and expensive packaging of the OSAs in Laser Packages, thereby increasing efficiency since only those OSAs having proper lens bonds are subjected to further testing and then inserted in expensive Laser Packages.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the views.

DETAILED DESCRIPTION OF THE CURRENTLY PREFERRED EMBODIMENTS

Figure 1:
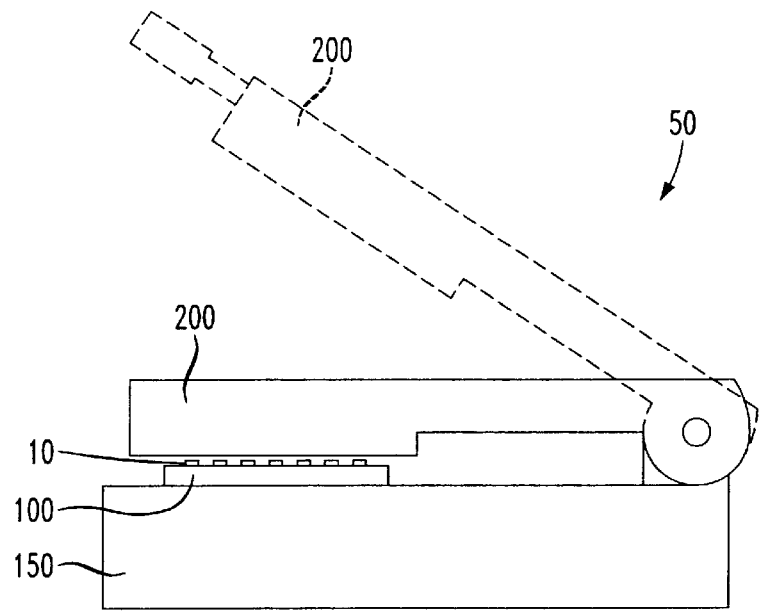
FIG. 1 is a side view of a particulate removal and lens bond testing device according to the present invention.

FIG. 1 shows the major components of a particulate removal/lens bond test device 50, according to a preferred embodiment of the present invention, for applying a flow of gas to optical subassemblies (OSAs) 10 arranged for testing on a waffle pack 100 so as to remove loose particulates from the OSAs 10 and to test the bond strength of the lenses on the OSAs 10. The particulate removal/lens bond test device 50 includes a base 150 for receiving the waffle pack 100 that holds an array of OSAs 10 to be tested. An applicator 200 for applying a flow of gas to the array of OSAs 10 held on waffle pack 100 is movably connected to base 150 for movement between a lowered or test position (shown in solid lines) and a raised or upper or OSA loading and unloading position (shown in dotted lines). The waffle pack 100 is positionable in and removable from a predetermined test position on base 150 while the applicator 200 is in the upper position. After positioning of waffle pack 100, the applicator 200 is pivotably moved to the lowered position for operatively removing loose particulates from and testing the lens bond strength of the OSAs 10. When this particulate removal and lens bond strength testing has been completed, the applicator 200 is pivotably returned to its upper position for removal of the tested waffle pack and positioning of a new waffle pack to be tested.

Figure 2:
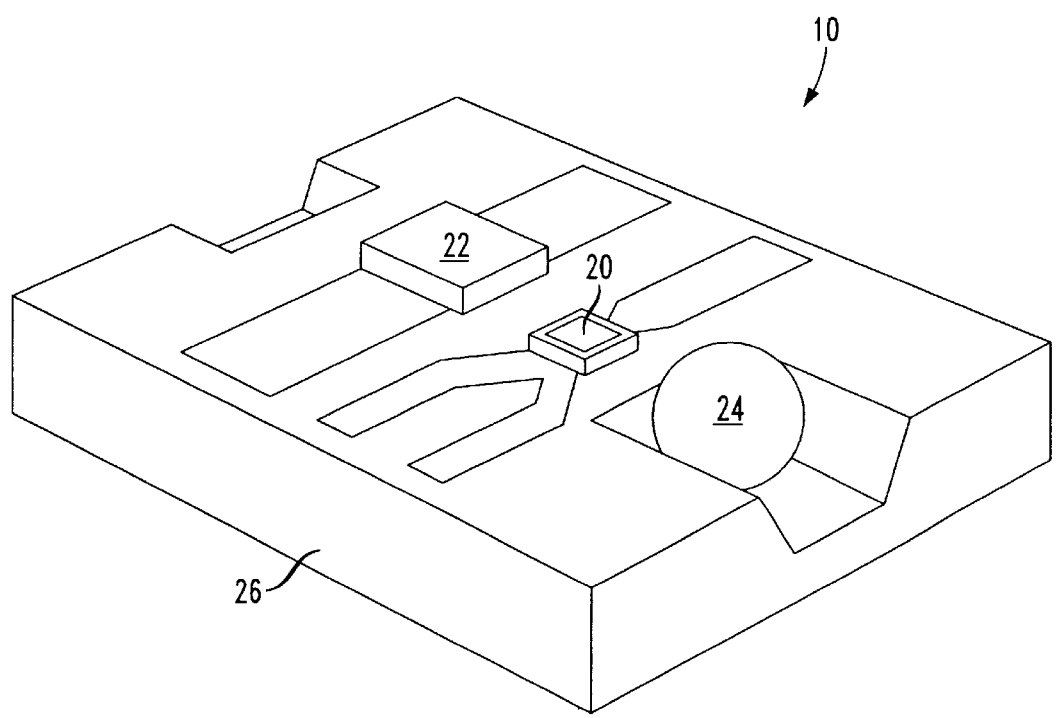
FIG. 2 is an elevated prospective view of an optical subassembly (OSA) for testing by the particulate removal and lens bond testing device of FIG. 1.

FIG. 2 depicts a typical OSA to be tested by the inventive apparatus. As shown, each OSA 10 has as its major components a laser 20, a photodiode 22 (for monitoring laser operation), and a spherical lens 24 mounted on a silicon substrate 26—also known as a silicon optical bench (siob). The OSA 10 further includes various electrical connections for the laser 20 and photodiode 22. After assembly, it is important to remove loose particulates from the OSA 10 before it is installed in expensive packaging such as laser packages; such particulates may otherwise interfere with the laser light signals by blocking the light signal or causing unintended reflections. The removal of loose particulates is accomplished in accordance with the invention by applying a predetermined flow of nitrogen gas across the OSAs 10 using applicator 200. The lens 24, which is typically a spherical lens, is bonded to the substrate 26 when heat is applied to the OSA 10, wherein a coating on lens 24 bonds with a coating on substrate 26. If any particulates are caught between the lens 24 and substrate 26, the required and intended bond may not be formed or may be incomplete. The predetermined flow of nitrogen gas applied to the OSA 10 will also therefore dislodge and remove lens 24 if the lens is not properly bonded to the substrate. Accordingly, after being subjected to the predetermined flow of nitrogen gas, technicians can remove any OSAs 10 lacking a lens 24 so that only those OSAs having a proper lens bond strength are installed in expensive laser packages and/or subjected to further testing.

Figure 3:
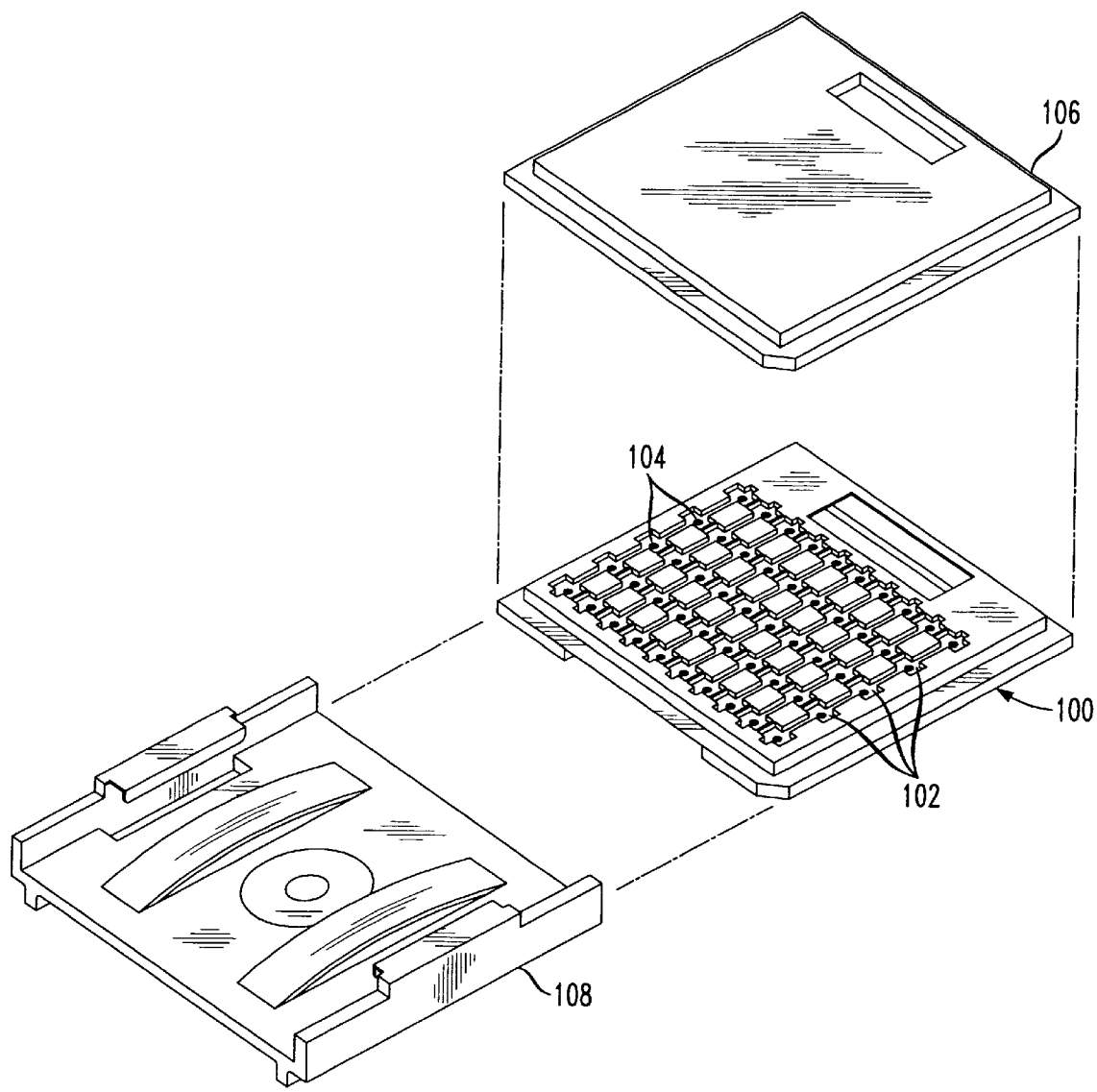
FIG. 3 depicts a waffle pack in which OSAs to be tested are loaded.
Figure 4:
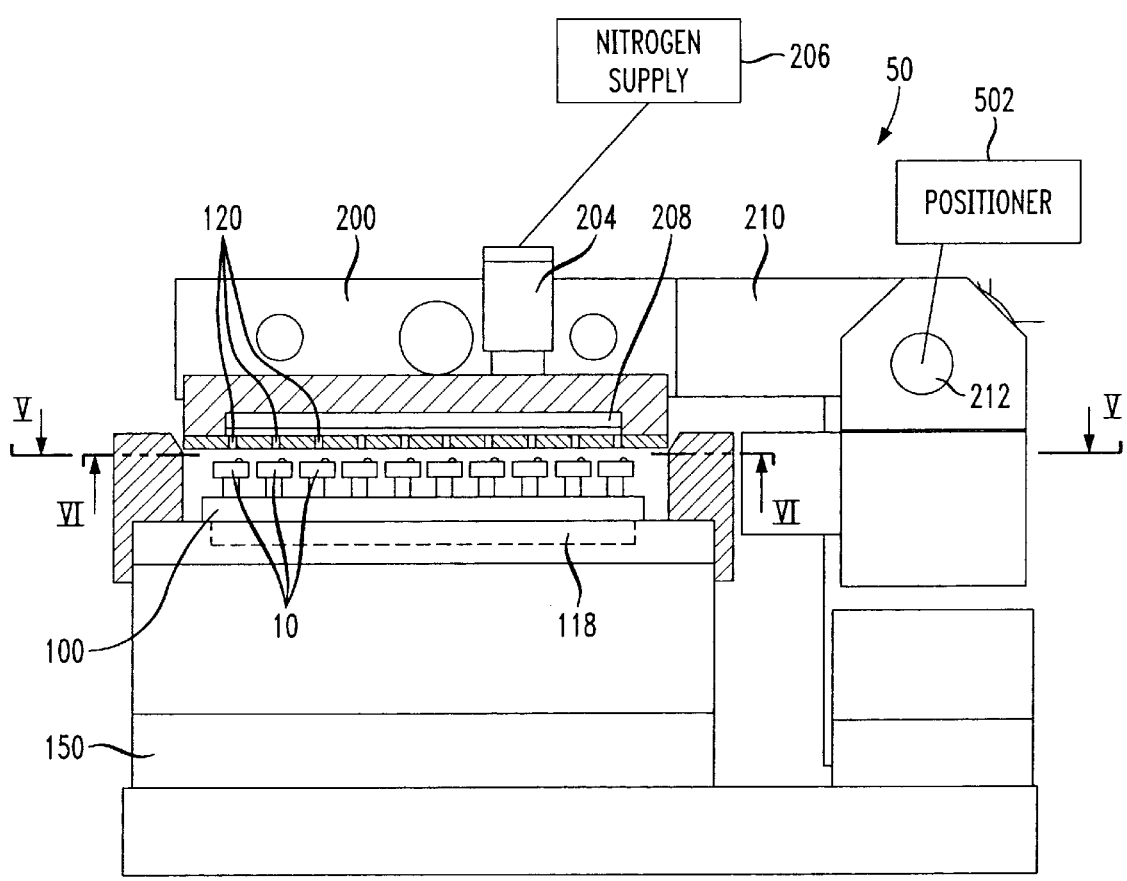
FIG. 4 is a cross-sectional side view of the particulate removal and lens bond testing device of FIG. 1.

Referring now to FIG. 3, a waffle pack 100 is shown having a typical 5×10 array of spaces 102 for holding fifty OSAs 10. Each space 102 has an associated through-hole 104 that communicates with a space or cavity 118 defined in the device base 150 immediately below the waffle pack 100 positioned for OSA testing (FIG. 4). FIG. 3 also shows a clip holder 108 and cover 106 that are used for handling the waffle pack 100 by technicians and engineers, but that are removed before the waffle pack is positioned in the device 50 for testing of the OSAs.

Figure 6:
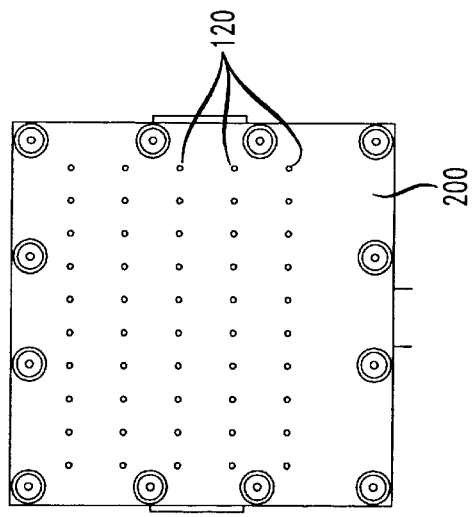
FIG. 6 is a bottom view of the applicator of the particulate removal and lens bond testing device taken along the lines VI—VI in FIG. 4.

FIG. 4 is a more detailed cross-sectional view of the particulate removal/test device 50 according to the embodiment of the invention shown in FIG. 1. The applicator 200 is mounted on an arm 210 that is pivotally connected to the base 150 to enable the applicator to pivot from the lowered position to the upper or raised position. The applicator 200 includes a plurality of orifices 120 which positionally correspond to the locations of the OSAs 10 in the 5×10 array in a waffle pack 100 positioned for testing in the device 50. The array of orifices 120 on a bottom of the applicator 200 can be clearly seen in FIG. 6. Each of the orifices 120 is in communication with a space 208 defined in applicator 200 and connected to a flow regulator 204 that is fed by an external nitrogen supply 206 that forms no part of the inventive device 50 in the embodiment herein described.

The particulate removal/lens bond test is thus performed by selective application of a predetermined flow of nitrogen gas via flow regulator 204 through the orifices 120 to each OSA 10 in the waffle pack 100, such that the flow of gas from each orifice is directed across a respective individual one of the OSAs 10 in pack 100. After the particulate removal/lens bond test has been successfully completed, the applicator 200 is pivotably moved to its upper position to provide sufficient clearance to allow the waffle pack 100 to be removed from the base 150 and/or to allow positioning on base 150 of a new waffle pack 100 carrying a new set of OSAs 10 to be tested. When the applicator 200 is then returned to its lowered position, the orifices 120 are automatically aligned with the new set of OSAs 10 in the new waffle pack. The regulator 204 is then again activated to supply a regulated flow of nitrogen gas to an therby test the OSAs 10. This process may be continuously repeated and provides advantageously consistent application of the nitrogen gas flow for removing loose particles from and testing the lens bond strength of the OSAs under test. A positioner 502 (shown schematically in FIG. 4) such, for example, as a motor or an actuator may optionally be provided for automatically moving the applicator between the raised and lowered positions.

The nitrogen supply 206 may and generally will be mounted or located remote from the applicator 200 and connected thereto by a flexible coupling or connector, or it may alternatively be mounted directly on applicator 200 or device 80. Instead of a regulator 204, applicator 200 may comprise a holding tank for nitrogen at a predetermined pressure, so that when a connection to the orifices is selectively opened, a regulated flow of nitrogen is supplied to each of the OSAs 10.

Figure 5:
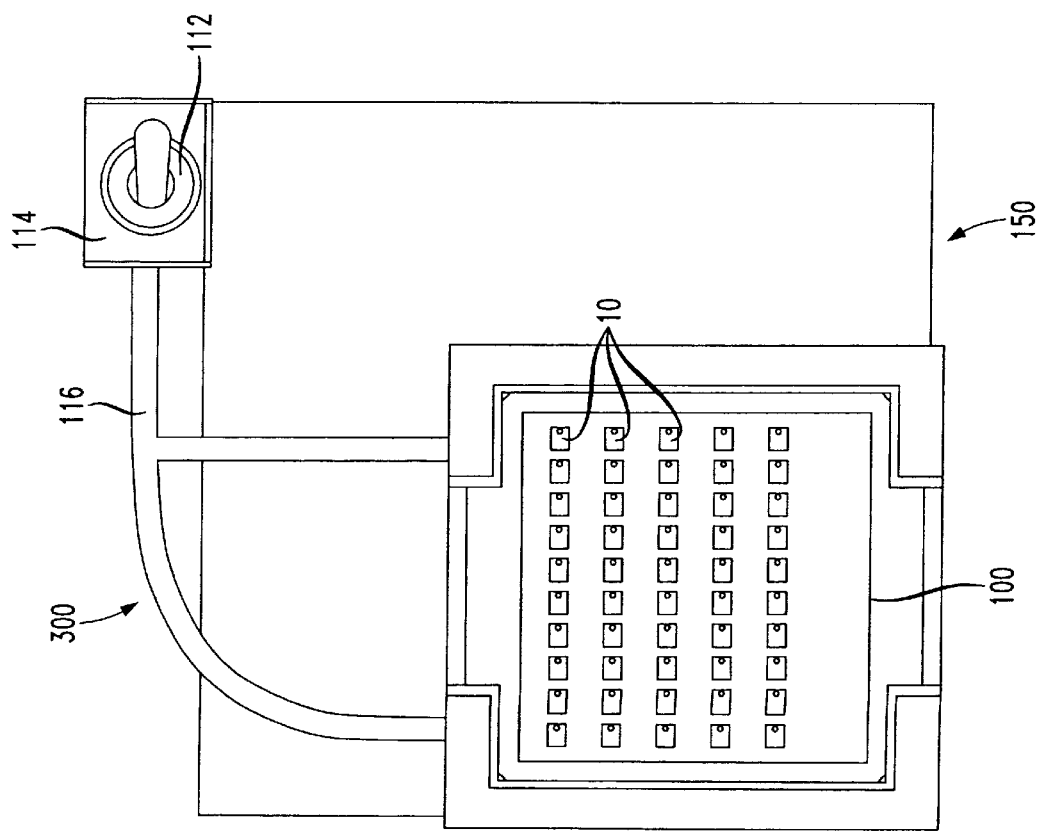
FIG. 5 is a top view of the base of the particulate removal and lens bond testing device taken along the lines V—V in FIG. 4.

As seen in FIG. 5, the base 150 may also includes a vacuum system 300 for creating a vacuum or low pressure condition in the cavity or area 118 defined beneath the testing position on the base 150 that receives the waffle pack 100 to be tested. The cavity 118 is in communication with a pump 114 via connection lines 116 and which is activated to draw air or gas from the cavity and thereby create low-pressure or a suction condition. The through-holes 104 defined in the bottom of waffle pack 100 beneath each respective OSA 10 are arranged so that the OSAs are drawn or otherwise urged toward and against the bottom of waffle pack 100 during operation of vacuum pump 114, thereby preventing movement of the OSAs in the waffle pack during the particulate removal/lens bond strength test. The vacuum system 300 may also include a manual switch 112 activatable for selectively creating the low pressure condition in cavity 118 beneath a waffle pack 100.

Although applicator 200 is shown mounted on an arm 210 for pivotal movement relative to the device base 150, it may instead be mounted for movement along a vertical or a horizontal support for respective vertical or horizontal movement with respect to the base. In addition, the particulate removal/lens bond test device 50 may optionally include a conveyer device for conveying the waffle packs 100 in an automated fashion to and from base 150 for testing.

Figure 7:
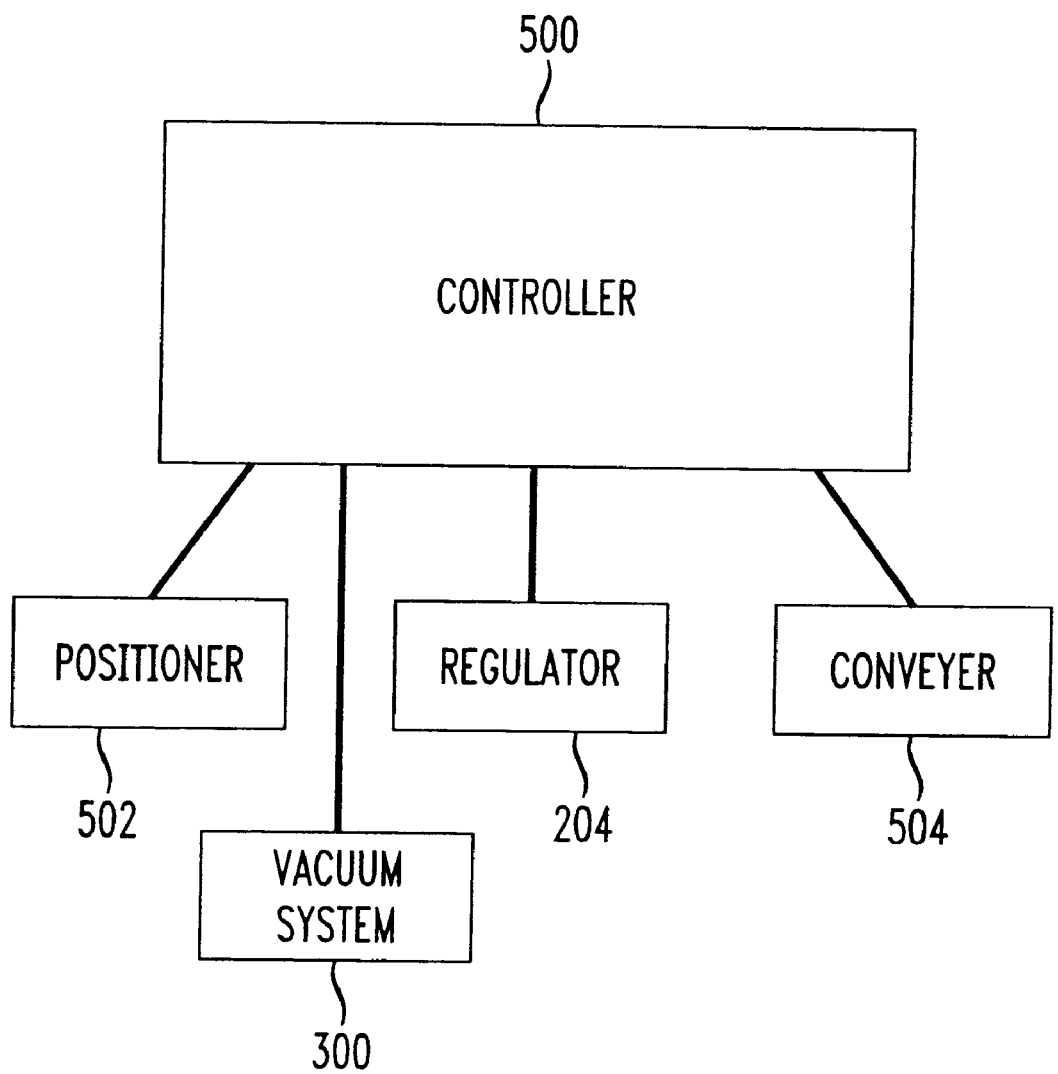
FIG. 7 is a block diagram of a controller for automated operation of the inventive testing device.

FIG. 7 is a block diagram of a controller 500 for automated operated of the particulate removal/lens bond test device 50 so as to control the entire process. The positioner 502 which comprises an actuator such, for example, as an electric motor, a hydraulic system or an air system is connectable to the applicator 200 for moving the applicator between its raised and lowered positions. A conveyor system may also be provided for transporting the waffle packs to and from the device base 150. Controller 500 controls the positioner 502 and conveyor 504, as well as the vacuum system 300 and regulator 204, to efficiently move the waffle pack 100 to be tested onto the base 150, pivot the applicator 200 to its lowered position, actuate the vacuum system 300, and activate regulator 204 to apply a flow of nitrogen gas to the OSAs under test. After completion of the test, the controller 500 actuates the positioner 502, conveyor 504, and vacuum system 300 to deactivate the vacuum system, return applicator 200 to its upper position, and transport the tested waffle pack 100 away from the device base 150.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A test device for removing loose particulates from optical subassemblies (OSAs) arranged in an array on a waffle pack and for concurrently testing a bond strength of lenses bonded to the OSAs, said test device comprising:

a base having a receiving area configured for removably receiving and supporting for testing, in a predetermined test position on the base, a waffle pack holding a plurality of OSAs; and an applicator including a gas flow regulator connectable to a gas supply for generating a predetermined flow of gas from the gas supply and configured for directing the predetermined flow of gas onto the OSAs arranged on the waffle pack supported on the base, said applicator being movable between a first test position in which at least a portion of the applicator is remotely spaced from said base so as to permit positioning of the waffle pack on the base for testing and removal of the waffle pack from the base after completion of testing, and a second testing position in which the applicator and base are disposed in close proximity to define therebetween a substantially closed space in which the waffle pack is nonremovably located for operative testing of the plural OSAs held in the waffle pack by application of said predetermined flow of gas onto the plural OSAs to remove loose particulates from the OSAs and test the bond strength of the OSA lenses.

2. A test device in accordance with claim 1, wherein said applicator is pivotally connected to said base for pivotal movement of said applicator relative to said base between said first and second positions of the applicator.

3. The test device of claim 1, further comprising a positioner for selectively moving said applicator between said first and second positions.

4. The test device of claim 1, wherein said applicator further comprises a plurality of orifices through which said flow of gas is operatively applied to the individual ones of the plural OSAs.

5. The test device of claim 4, wherein said plural orifices are aligned in said second position of the applicator in an array corresponding to the array of the OSAs on the waffle pack so that each of the orifices directs a gas flow onto a corresponding one of the plural OSAs.

6. The test device of claim 4, wherein said gas flow regulator further comprises a regulating valve for selectively directing the gas flow to and through said plural orifices.

7. The test device of claim 1, further comprising a vacuum system for creating a reduced pressure condition in an area of said base located immediately below the waffle pack supported for testing on the base in said second position of the applicator.

8. The test device of claim 1, further comprising a controller operatively connected to said gas flow regulator for controlling the generation of said predetermined flow of gas.

9. The test device of claim 8, further comprising a vacuum system for creating a reduced pressure condition in an area of said base located immediately below the waffle pack supported for testing on the base in said second position of the applicator, said controller connected to said vacuum system for controlling said reduced pressure condition.

10. The test device of claim 9, further comprising a positioner operatively connected for moving said applicator between said first and second positions, said controller operatively connected to said positioner for controlling a movement of said applicator.

11. A test device for removing loose particulates from optical subassemblies (OSAs) arranged in an array on a waffle pack and for concurrently testing a bond strength of lenses bonded to the OSAs, said test device comprising:

a waffle pack defining an array of spaces for holding a plurality of the OSAs to be tested;

a base having a receiving area configured for removably receiving and supporting for testing, in a predetermined test position on the base, a waffle pack holding a plurality of OSAs; and an applicator including a gas flow regulator connectable to a gas supply for generating a predetermined flow of gas from the gas supply and configured for directing the predetermined flow of gas onto the OSAs arranged on the waffle pack supported on the base, said applicator being movable between a first test position in which at least a portion of the applicator is remotely spaced from said base so as to permit positioning of the waffle pack on the base for testing and removal of the waffle pack from the base after completion of testing, and a second testing position in which the applicator and base are disposed in close proximity to define therebetween a substantially closed space in which the waffle pack is nonremovably located for operative testing of the plural OSAs held in the waffle pack by application of said predetermined flow of gas onto the plural OSAs to remove loose particulates from the OSAs and test the bond strength of the OSA lenses.

12. The test device of claim 11, wherein said applicator further comprises a plurality of orifices through which said flow of gas is operatively applied to the individual ones of the plural OSAs, wherein said plural orifices are aligned in said second position of the applicator in an array corresponding to the array of said spaces on said waffle pack so that each of the orifices directs the gas flow into a corresponding one of the plural OSAs.

13. The test device of claim 11, further comprising a vacuum system for creating a reduced pressure condition in an area of said base located immediately below the waffle pack supported for testing on the base in said second position of the applicator, wherein said waffle pack comprises a bottom having holes therethrough in each of said spaces for holding the OSAs, said holes in said waffle pack operatively arranged for communicating with said space when said waffle pack is supported for testing on said base.

14. The particulate removal/lens bond test device of claim 13, further comprising a positioner operatively connected between said applicator and said base for moving of said applicator between said first and second positions.

15. The particulate removal/lens bond test device of claim 14, further comprising a controller operatively connected to said positioner, said gas flow regulator, and said vacuum system for controlling a movement of said applicator, controlling said flow of gas, and controlling said vacuum system.

* * * * *